(12) United States Patent
Liu

(10) Patent No.: US 9,633,299 B2
(45) Date of Patent: Apr. 25, 2017

(54) CHIP-EMBEDDED RFID TAG AND MANUFACTURING METHOD THEREOF

(71) Applicant: Shanghai YAOCHUAN Information Technology CO., Ltd., Shanghai (CN)

(72) Inventor: Zhijia Liu, Shanghai (CN)

(73) Assignee: SHANGHAI YAOCHUAN INFORMATION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 14/907,682

(22) PCT Filed: Jul. 22, 2014

(86) PCT No.: PCT/CN2014/082737
§ 371 (c)(1),
(2) Date: Jan. 26, 2016

(87) PCT Pub. No.: WO2015/010609
PCT Pub. Date: Jan. 29, 2015

(65) Prior Publication Data
US 2016/0155043 A1 Jun. 2, 2016

(30) Foreign Application Priority Data
Jul. 26, 2013 (CN) .......................... 2013 1 0321164

(51) Int. Cl.
G06K 7/08 (2006.01)
G06K 19/06 (2006.01)
G06K 19/077 (2006.01)

(52) U.S. Cl.
CPC . *G06K 19/07732* (2013.01); *G06K 19/07728* (2013.01); *G06K 19/07749* (2013.01); *G06K 19/07773* (2013.01)

(58) Field of Classification Search
USPC .................................................. 235/451, 492
See application file for complete search history.

(56) References Cited

U.S. PATENT DOCUMENTS 7,002,475 B2 * 2/2006 Brady ................. G06K 19/041
336/110
7,586,415 B2 * 9/2009 Lee ................. G06K 19/07749
340/572.7

(Continued)

FOREIGN PATENT DOCUMENTS

| CN | 1818936 A | 8/2006 |
| CN | 101064014 A | 10/2007 |
| CN | 103353948 A | 10/2013 |

OTHER PUBLICATIONS

International Search Report dated Oct. 28, 2014 received in International Application No. PCT/CN2014/082737.

*Primary Examiner* — Tuyen K Vo
(74) *Attorney, Agent, or Firm* — Scott, Scott, Murphy & Presser, P.C.

(57) ABSTRACT

Provided is a chip-embedded RFID tag, comprising: a first metal casing; a spacer insulator disposed on the first metal casing; a second metal casing disposed on the spacer insulator; a first electrical connecting component, the first metal casing and the second metal casing forming electrical connection via the first electrical connecting component; second electrical connecting components, an RFID chip forming electrical connection with the first metal casing and the second metal casing via the second electrical connecting components; and the first metal casing is separated from the second metal casing by the spacer insulator. Also provided is a method for manufacturing the chip-embedded RFID tag. The chip-embedded RFID tag directly utilizes a metal casing as the antenna of a tag, improving the tag read performance, and also greatly impact resistance and environment resistance performance thereof.

14 Claims, 10 Drawing Sheets

(56) References Cited

U.S. PATENT DOCUMENTS

| | | | |
|---|---|---|---|
| 2007/0200706 A1* | 8/2007 | Lee | G06K 19/07749 340/572.7 |
| 2007/0229276 A1* | 10/2007 | Yamagajo | G06K 19/07786 340/572.7 |
| 2008/0150726 A1* | 6/2008 | Yamagajo | H01Q 9/0407 340/572.7 |
| 2009/0212913 A1* | 8/2009 | Barksdale | G09F 3/02 340/10.1 |
| 2011/0025471 A1* | 2/2011 | Popugaev | G06K 19/07749 340/10.3 |
| 2011/0121083 A1* | 5/2011 | Voigtlaender | G06K 19/047 235/492 |
| 2011/0253793 A1 | 10/2011 | King | |
| 2011/0315774 A1* | 12/2011 | Baba | G06K 19/0772 235/488 |
| 2012/0126016 A1* | 5/2012 | Yang | G06K 19/07771 235/492 |
| 2013/0037617 A1* | 2/2013 | Weakley | G06K 19/0723 235/492 |
| 2013/0099004 A1* | 4/2013 | Alo | G06K 19/07327 235/492 |
| 2014/0008437 A1* | 1/2014 | Wang | H01Q 1/2216 235/439 |

\* cited by examiner

CHIP-EMBEDDED RFID TAG AND MANUFACTURING METHOD THEREOF

TECHNICAL FIELD

The present invention relates to an RFID tag and a manufacturing method thereof, in particular, to a chip-embedded RFID tag and a manufacturing method thereof.

BACKGROUND ART

RFID, namely a Radio Frequency Identification technology, which is also referred as radio frequency identification of an electrical tag, is a communication technology and may identify a specific object and read-write related data through a radio signal, without establishing mechanical or optical contact between an identification system and the specific object.

A communication distance and scope of an RFID tag are main aspects of performances, and meanwhile, the durability of the tag is also very important as required by the operation environment. US patent US2011253793 discloses a ceramic tag and an assembly method thereof under an extreme environment, wherein a metal casing is taken as a second antenna to be coupled with an internal ceramic antenna, but the communication range of the ceramic tag is still too small. In order to improve the efficiency and facilitate the operation, there is an urgent demand for an RFID tag which has wide communication range, and excellent durability and environment applicability.

SUMMARY

In order to solve the above-mentioned problem, the present invention provides a chip-embedded RFID tag and a manufacturing method thereof.

A chip-embedded RFID tag comprises a first metal casing; a spacer insulator disposed on the first metal casing; a second metal casing disposed on the spacer insulator; a first electrical connecting component for connecting the first metal casing and the second metal casing to form electrical connection; second electrical connecting components for connecting an RFID chip with the first metal casing and the second metal casing respectively to form electrical connections; and wherein the first metal casing is separated from the second metal casing by the spacer insulator.

According to one embodiment of the present invention, the first electrical connecting component and the second electrical connecting components are metal sheets.

According to another embodiment of the present invention, the first electrical connecting component and the first metal casing are of an integrated structure, or the first electrical connecting component and the second metal casing are of an integrated structure.

According to another embodiment of the present invention, the first metal casing and the second metal casing are made of aluminum alloy or stainless steel.

According to another embodiment of the present invention, the first metal casing is welded or adhered to an object.

According to another embodiment of the present invention, through holes are formed in the bottom of the first metal casing and is used for fastening the first metal casing to the object via steel ropes, bands or screws.

According to another embodiment of the present invention, the spacer insulator comprises an insulating spacer and filler, wherein the first electrical connecting component, the second electrical connecting components and the RFID chip are sandwiched between the insulating spacer and the filler.

According to another embodiment of the present invention, a material of the insulating spacer is selected from acrylonitrile-butadiene-styrene plastic, polycarbonate or nylon.

According to another embodiment of the present invention, a material of the filler is selected from ceramic, acrylonitrile-butadiene-styrene plastic, polycarbonate plastic, polyethylene terephthalate plastic, polytetrafluoroethylene, silica gel or air.

According to another embodiment of the present invention, the first metal casing and the second metal casing are cylinders each with one end closed and the other end opened, the insulating spacer consists of an annular spacer body and an annular bulge formed by surrounding the circumference of the spacer body, the annular bulge is sandwiched between adjacent end surfaces of the two metal casings, and the filler is located in a cavity at the center of the insulating spacer.

According to another embodiment of the present invention, each second electrical connecting component is clamped on the inner wall of the spacer body, is formed by stamping a metal sheet and has a vertical portion, a horizontal portion connected with the vertical portion and an inclined portion connected with the horizontal portion, and the vertical portions of the two second electrical connecting components are respectively fixed with two pins of the RFID chip in a welding manner.

According to another embodiment of the present invention, the first metal casing is a cylinder with one end closed and other end opened, the second metal casing is circular, the insulating spacer is annular, the height of the insulating spacer is equal to the depth of a cavity of the cylinder of the first metal casing, the filler is a cylinder and positioned in the cavity at the center of the insulating spacer, the diameter of the filler is the same as the inner diameter of the insulating spacer, the sum of the height of the filler and the height of the second metal casing is the same as the depth of the cavity of the insulating spacer, and the difference between the radius of the inner circle of the first metal casing and the radius of the second metal casing is the same as the thickness of the side wall of the insulating spacer.

According to another embodiment of the present invention, the first metal casing is circular, the second metal casing is a cylinder with one end closed and the other end opened, the diameter of the first metal casing is equal to the outer diameter of the second metal casing, the insulating spacer is a circular ring having a lug boss, the diameter of the lower portion of the insulating spacer is larger than the diameter of the upper portion thereof, the outer diameter of the upper portion of the insulating spacer is equal to the inner diameter of the second metal casing, and the outer diameter of the lower portion of the insulating spacer is equal to the outer diameter of the second metal casing.

According to another embodiment of the present invention, barbs are formed on the inner wall of the first metal casing and the inner wall of the second metal casing.

The present invention also provides a manufacturing method of a chip-embedded RFID tag, comprising the following steps: a) securing an RFID tag to two second electrical connecting components; b) press-mounting a first electrical connecting component, a spacer insulator and the RFID chip assembled in the step a) to the surface of the first metal casing, and making the first electrical connecting component and the second electrical connecting components to contact the first metal casing; and c) press-fitting the second metal casing with the first metal casing assembled in the step b), and making the first electrical connecting component and the second electric connecting components to contact the second metal casing respectively.

According to one embodiment of the present invention, the spacer insulator comprises an insulating spacer and filler, wherein the step a) comprises: stamping a metal sheet to form two second electrical connecting components, and welding two pins of the RFID chip with the two second electrical connecting components; stamping a metal sheet to form a first electrical connecting component; the step b) comprises: assembling the first electrical connecting components, the assembled second electrical connecting components and the RFID chip with the insulating spacer and the filler, so that the first electrical connecting component, the second electrical connecting components and the RFID chip are sandwiched between the insulating spacer and the filler; the step c) comprises: press-mounting the filler and the insulting spacer assembled in the step b) to the first metal casing, and making the first electrical connecting component and the second electrical connecting components between the filler and the insulating spacer to contact the first metal casing respectively; and press-fitting the second metal casing with the assembled first metal casing, and making the first electrical connecting component and the second electrical connecting components to contact the second metal casing respectively.

According to the chip-embedded RFID tag provided by the present invention, the metal casings are directly utilized as antennae of the tag, so that not only is the reading performance of the label improved, but also the impact resistance and the environment applicability thereof are also greatly improved; in addition, the spacer insulator is filled between the first metal casing and the second metal casing, so that the two casings as the antennae do not contact directly with each other and can thus play roles of receiving the electromagnetic wave energy and radiating the electromagnetic wave energy; and compared with an existing antenna, the antennae of the present invention utilizes the internal space more effectively, enhances the radiation capability and the receiving antennae of the antennae and greatly improves the frequency bandwidth of the product.

BRIEF DESCRIPTION OF THE ATTACHED DRAWINGS

Figure 1:
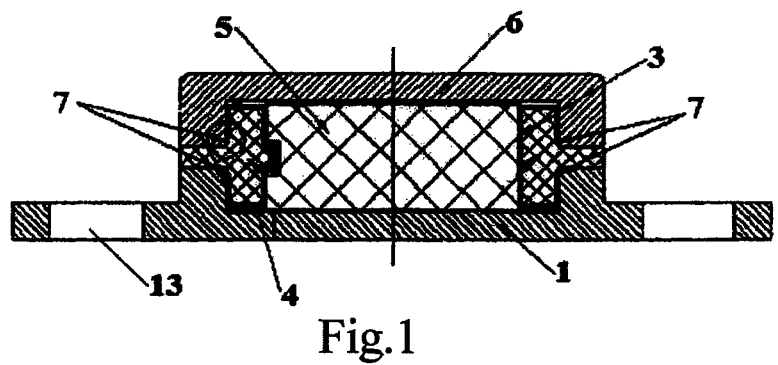
FIG. 1 is a sectional view of the chip-embedded RFID tag of Embodiment 1 of the present invention.

Wherein, the reference signs are illustrated as follows:

| | | | |
|---|---|---|---|
| 1. | first metal casing | 2. | insulating spacer |
| 3. | first metal elastic sheet | 4. | second metal elastic sheet |
| 5. | insulating ceramic | 6. | second metal casing |
| 7. | barbs | 11. | base |
| 12. | body | 13. | through hole |
| 14. | rectangular through hole | 21. | spacer body |
| 22. | annular bulge | 23. | No. I slot |
| 31. | vertical portion | 32. | horizontal portion |
| 33. | inclined portion | 41. | third metal elastic sheet |
| 42. | RFID chip | 51. | No. II slot |
| 52. | No. III slot | | |

SPECIFIC EMBODIMENTS

A chip-embedded RFID tag of the present invention is further illustrated as below.

A chip-embedded RFID tag of the present invention comprises a first metal casing; a spacer insulator disposed on the first metal casing; a second metal casing disposed on the spacer insulator; a first electrical connecting component for connecting the first metal casing and the second metal casing to form electrical connection; second electrical connecting components for connecting the RFID tag with the first metal casing and the second metal casing respectively to form electrical connection; and wherein, the first metal casing is separated from the second metal casing by the spacer insulator.

According to the chip-embedded RFID tag provided by the present invention, the spacer insulator is filled between the first metal casing and the second metal casing, so that the two metal casings as antennae do not contact directly with each other and thus can play roles of receiving electromagnetic wave energy and irradiating the electromagnetic wave energy, and compared with an existing antenna, the antennae of the present invention utilize the internal space more effectively, enhance the irradiation capability and the receiving capability of the antennae and greatly improve the frequency bandwidth of the product.

According to the chip-embedded RFID tag provided by the present invention, a chip of the tag is fed directly inside the metal casings via the metal elastic sheets to acquire energy from the antennae and is thus activated into operation; at opposite positions of the RFID chip, the first metal casing and the second metal casing are connected by the first electrical connecting component to form a short-circuit, which can play a role of adjusting the resonant frequency and the antenna impedances of the antennae of the tag; and in the RFID antenna design, the impedances of the antennae need to form a conjugate match relation with the impedance of the chip to thus realize the maximum transmission of energy from the antennae to the chip, and short-circuit loading of the electrical connecting components in the present invention plays a role of coordinating antenna impedance and chip matching, and can form wideband matching to expand the bandwidth range of the product.

According to the chip-embedded RFID tag provided by the present invention, the metal casings are directly utilized as the antennae of the tag, so that not only is the reading performance of the tag improved, but also the impact resistance and the environment applicability thereof are greatly improved.

The chip-embedded RFID tag of the present invention can be applied to operation on surfaces of various substances, such as surfaces of metals, plastics, glass and bottles and cans containing liquid; can work in extreme temperature environments, for instance, −40° C. and 350° C.; can resist high strength impact and vibration; can resist high strength pressure and corrosion, for instance, in environments of deep sea and deep water; and has ultrawide frequency bandwidth ad can work at a global ultrahigh frequency RFID band.

The specific structure and the manufacturing method of the chip-embedded RFID tag of the present invention are concretely illustrated as below in combination with accompanying drawings and embodiments:

Embodiment 1

Figure 2:
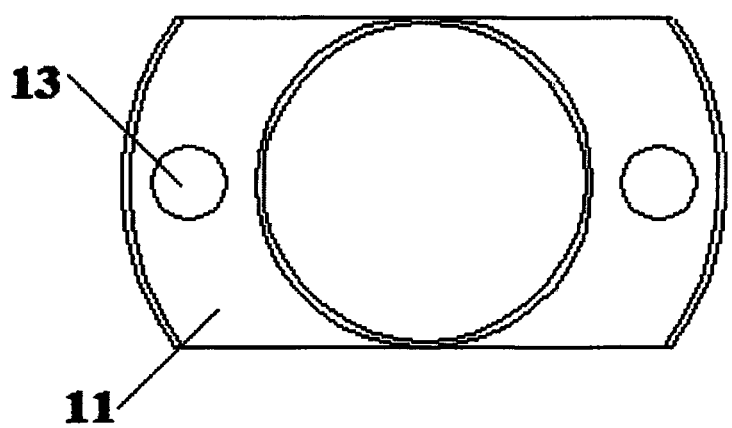
FIG. 2 is a top view of the chip-embedded RFID tag of Embodiment 1 of the present invention.
Figure 3:
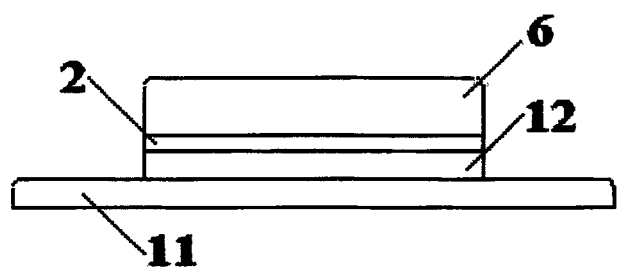
FIG. 3 is a side view of the chip-embedded RFID tag of Embodiment 1 of the present invention.

As shown in FIGS. 1 to 3, the chip-embedded RFID tag of the present invention consists of a first metal casing 1, an insulating spacer 2, a first metal elastic sheet 3, a second metal elastic sheet 4, insulating ceramic 5 and a second metal casing 6, wherein the insulating spacer 2, the first metal elastic sheet 3, the second metal elastic sheet 4 and the insulating ceramic 5 are positioned inside a cavity formed by the first metal casing 1 and the second metal casing 6.

Figure 4:
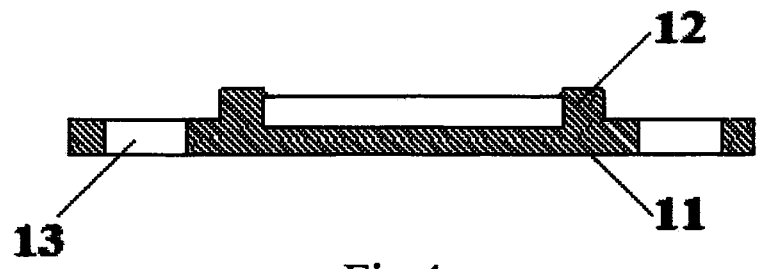
FIG. 4 is a sectional view of a first metal casing of the chip-embedded RFID tag of Embodiment 1 of the present invention.

As shown in FIGS. 2 to 4, the first metal casing 1 comprises a base 11 and a body 12, wherein the base 11 is of an irregular cuboid of which two width portions are of circular arcs shapes, the body 12 is cylindrical and is formed in the middle of the base 11, and the outer diameter of the body 12 is the same as the width of the base 11; and two through holes 13 are symmetrically formed in the base 11 and each located on a respective side of the body 12 and can be configured to fix the first metal casing 1 to an object via screws, wherein the base 11 and the body 12 are of an integrated structure.

Figure 5:
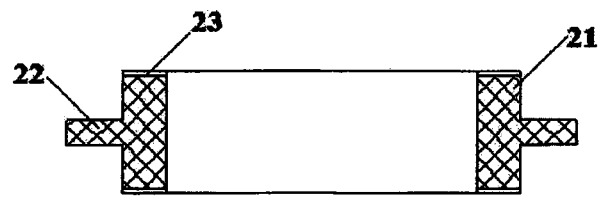
FIG. 5 is a sectional view of the insulating spacer of the chip-embedded RFID tag of Embodiment 1 of the present invention.

As shown in FIG. 5, the insulating spacer 2 comprises an annular spacer body 21 and an annular bulge 22 surrounding the circumference of the spacer body 21, wherein the annular bulge 22 has a height lower than that of the spacer body 21 and is positioned at the center portion of the spacer body 21 in a height direction, the spacer body 21 and the annular bulge 22 are of an integrated structure and made of high-temperature resistant polytetrafluoroethylene, and four No. 1 slots 23 are symmetrically formed in the upper surface and the lower surface of the spacer body 21 in a diameter direction; and wherein, the distance between the bottom of the annular bulge 22 and the bottom of the spacer body 21 is the same as the height or the depth of the body 12 of the first metal casing, the outer diameter of the spacer body 21 is the same as the inner diameter of the body 12 of the first metal casing, and the outer diameter of the annular bulge 22 is the same as the outer diameter of the body 12 of the first metal casing.

Figure 10:
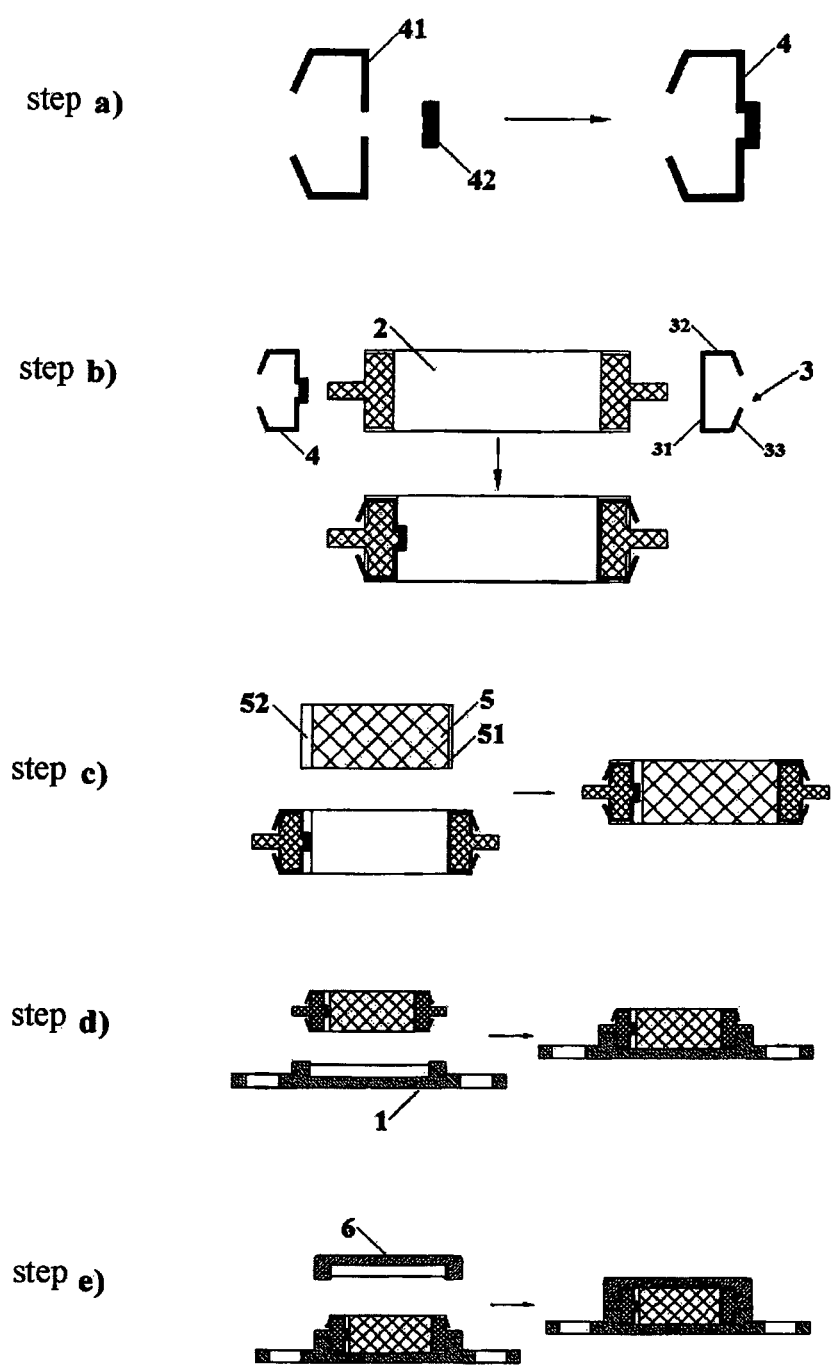
FIG. 10 is a schematic view of a manufacturing method of the chip-embedded RFID tag of Embodiment 1 of the present invention.

As shown in FIG. 10, the first metal elastic sheet 3 is a frame formed by stamping a strip-shaped metal sheet, and has a vertical portion 31, two horizontal portions 32 respectively connected with a respective end of the vertical portion 31, and two inclined portions 33 connected with the two horizontal portions 32 respectively, and two end portions of the two inclined portions 33 approaches to each other to form an opening.

The second metal elastic sheet 4 consists of two third metal elastic sheets 41 and an RFID chip 42, wherein the two metal elastic sheets 4 each has a shape and size the same as the first metal elastic sheet 3, two pins (RF, GND) of the RFID chip 42 are welded to the two third metal elastic sheets 41 respectively, the RFID chip 42 is positioned at the middle section of a vertical portion of the second metal elastic sheet 4, the two third metal elastic sheets 41 do not form electrical connection directly, and the two third metal elastic sheets 41 are also connected to a plastic card (not shown in FIGs.), so that the structure of the two second metal casings 4 are firmer, and the above-mentioned size refers to physical quantities, namely height, width, length and angle for describing the frame.

As shown in FIG. 1 and FIG. 10, the insulating spacer 2 is positioned inside a cavity of the body 12 of the first metal casing 1, the first metal elastic sheet 3 and the second metal elastic sheet 4 are respectively embedded to the side wall of the spacer body 21 of the insulating spacer 2, and four horizontal portions are seated into the four No. I slots 23, so that the first metal elastic sheet 3 and the second metal elastic sheet 4 keep flush with the upper surface and the lower surface of the spacer body 21 respectively or lower than the upper surface and the lower surface of the spacer body 21 respectively, the two vertical portions are closely clung to the inner wall of the insulating spacer 2, the RFID chip 42 is located on the inner side of the insulating spacer 2, and the annular bulge 22 extends from the opening of the first metal elastic sheet 3 and the second metal elastic sheet 4 and is then located on the upper portion of the body 12; and cylindrical insulating ceramic 5 is filled in the cavity at the center of the insulating spacer 2, and No. II slots 51 and No. III slots 52 which are respectively matched with the vertical portions of the first metal elastic sheet 3 and the second metal elastic sheet 4 are formed in the side wall of the insulating ceramic 5.

The second metal casing 6 is a cylinder with one end closed and the other end opened, wherein the inner diameter and the outer diameter of the second metal casing 6 are the same as those of the body 12, the opening of the second metal casing 6 faces downward and covers the upper side of the insulating spacer 2, and the circumference of the opening thereof is in contact with the annular bulge 22.

Figure 6:
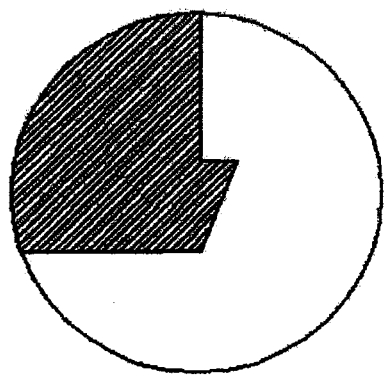
FIG. 6 is an enlarged sectional view of barbs of the chip-embedded RFID tag of Embodiment 1 of the present invention.

As shown in FIG. 1 and FIG. 6, barbs 7 are respectively disposed on the inner wall of the first metal casing 1 and the second metal casing 6, wherein the vertical cross section of each barb 7 is an inverted right-angled triangle, the vertical side thereof extends from the inner wall of the first metal casing 1 and the inner wall of the second metal casing 6, the horizontal side thereof forms a buckle structure with the first metal elastic sheet 3 and the second metal elastic sheet 4, and by this buckle structure, the metal casings can be effectively prevented from falling off; moreover, the first metal elastic sheet 3 and the second metal elastic sheet 4 are in close fit with the first metal casing 1 and the second metal casing 6 to form a desirable electrical connecting path, and the barbs 7 and the metal casings are of an integrated structure.

Embodiment 2

Figure 7:
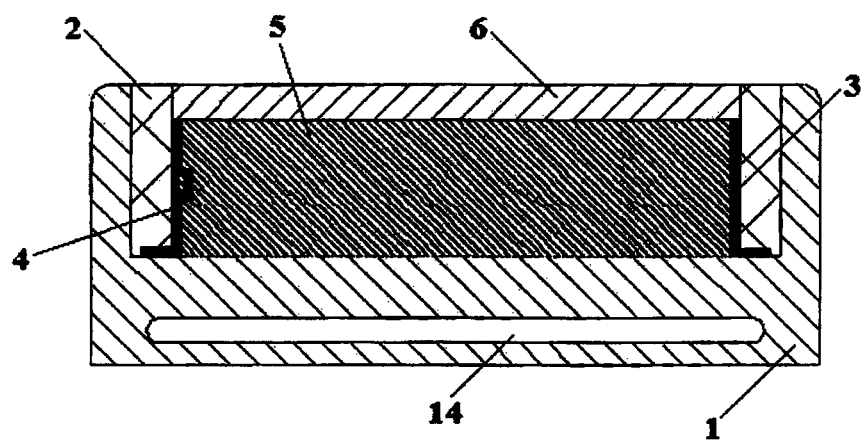
FIG. 7 is a sectional view of the chip-embedded RFID tag of Embodiment 2 of the present invention.

As shown in FIG. 7, the chip-embedded RFID tag consists of a first metal casing 1, an insulating spacer 2, a first metal elastic sheet 3, a second metal elastic sheet 4, insulating ceramic 5 and a second metal casing 6, wherein the insulating spacer 2, the first metal elastic sheet 3, the second metal elastic sheet 4 and the insulating ceramic 5 are positioned inside a cavity formed by the first metal casing 1 and the second metal casing 6.

The first metal casing 1 is of a cylinder with one end closed and the other end opened, rectangular through holes 14, extending along a horizontal direction, are formed in the bottom of the first metal casing 1, and the chip-embedded RFID tag can be secured to an object via the rectangular through holes 14 by means of steel ropes and bands; and the second metal casing 6 is circular, and the diameter of the second metal casing 6 is less than the inner diameter of the first metal casing 1.

Figure 8:
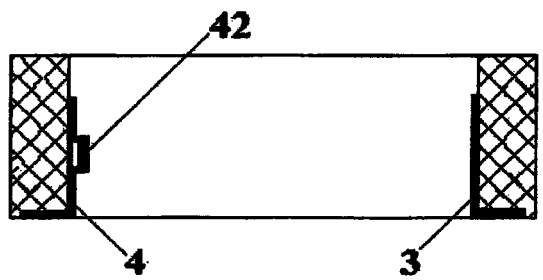
FIG. 8 is a sectional view of assembled insulating spacer and two metal elastic sheets of the chip-embedded RFID tag of Embodiment 2 of the present invention.

As shown in FIG. 8, the insulating spacer 2 is an annular spacer, wherein the height thereof is the same as the height or the depth of the internal cavity of the first metal casing 1, and two clamping slots (not shown in FIGs.) each of which is ⊐-shaped and which extend along a horizontal direction are symmetrically formed in the lower surface of the insulating spacer 2 along a diameter direction.

The first metal elastic sheet 3 is L-shaped and consists of a horizontal portion and a vertical portion, the second metal elastic sheet 4 and the first metal elastic sheet 3 are the same in shape and size (length, width and height), the second metal elastic sheet 4 is formed by welding two metal elastic sheets to two pins of the RFID chip 42 respectively, and the two metal elastic sheets are linear and L-shaped respectively.

The shape of the insulating ceramic 5 is the same as that in Embodiment 1, the insulating ceramic 5 has a height slightly lower than the insulating spacer 2, the diameter of the insulating ceramic 5 is the same as the inner diameter of the insulating spacer 2 or the same as the diameter of the second metal casing 6, and the sum of the height of the insulating ceramic 5 and the height of the second metal casing 6 is equal to the height or the depth of the insulating spacer 2.

The horizontal portions of the first metal elastic sheet 3 and the second metal elastic sheet 4 are respectively inserted into two clamping slots in the bottom of the insulating spacer 2 and are then secured to the insulating spacer 2, and the vertical portions of the first metal elastic sheet 3 and the second metal elastic sheet 4 are clung to the inner wall of the insulating spacer 2.

The insulating spacer 2 is located inside the cavity of the first metal casing 1, the insulating ceramic 5 is located inside the cavity at the center of the insulating spacer 2 and is clung to the first metal elastic sheet 3 and the second metal elastic sheet 4 respectively, the second metal casing 6 is located on the upper portion of the insulating ceramic 5, the side wall of the second metal casing 6 is clung to the side wall of the insulating spacer 2, and a portion of the insulating spacer 2 which is higher than the insulating ceramic 5 is sandwiches between the two metal casings to prevent the two metal casings from immediately contacting with each other; and the first metal elastic sheet 3 and the second metal elastic sheet 4 respectively contact the first metal casing 1 and the second metal casing 6, so that the first metal elastic sheet 3 and the second metal elastic sheet 4 form electrical connection with the two metal casings.

Embodiment 3

Figure 9:
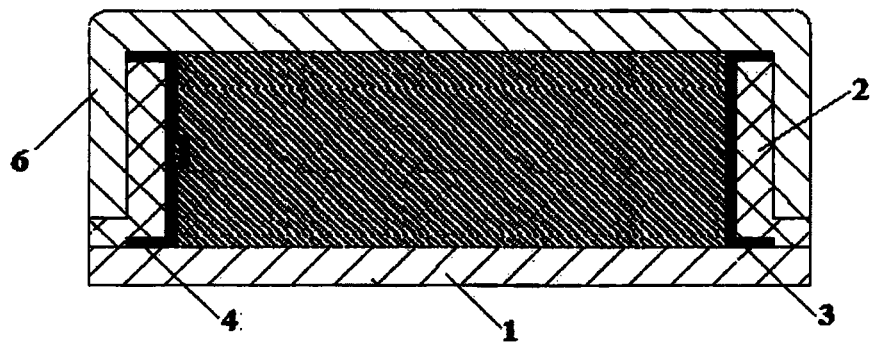
FIG. 9 is a sectional view of the chip-embedded RFID tag of Embodiment 3 of the present invention.

As shown in FIG. 9, the chip-embedded RFID tag consists of a first metal casing 1, an insulating spacer 2, a first metal elastic sheet 3, a second metal elastic sheet 4, insulating ceramic 5 and a second metal casing 6, wherein the insulating spacer 2, the first metal elastic sheet 3, the second metal elastic sheet 4 and the insulating ceramic 5 are positioned inside a cavity formed by the first metal casing 1 and the second metal casing 6.

The first metal casing 1 is circular, the second metal casing 6 is a cylinder with one end closed and the other end opened, and the diameter of the first metal casing 1 is the same as the outer diameter of the second metal casing 6.

The insulating spacer 2 is a circular ring having a lug boss, wherein the diameter of the lower portion of the insulating spacer 2 is larger than that of the upper portion thereof, the outer diameter of the upper portion of the insulating spacer 2 is the same as the inner diameter of the second metal casing 6, the outer diameter of the lower portion of the insulating spacer 2 is the same as the outer diameter of the second metal casing 6, and four clamping slots (not shown in FIGs.) each of which is ⊐-shaped and which extend along a horizontal direction are symmetrically formed in the upper surface and the lower surface of the insulating spacer 2 along a diameter direction.

The first metal casing 3 is U-shaped, the second metal elastic sheet 4 is the same as the first metal elastic sheet 3 in shape and size (length, width and height), and the second metal elastic sheet 4 is formed by welding two L-shaped metal elastic sheets to two pins of the RFID chip 42 respectively.

The insulating spacer 2 is located on the first metal casing 1, the first metal elastic sheet 3 and the second metal elastic sheet 4 are clamped to the inner wall of the insulating spacer 2 via clamping slots respectively, the insulating ceramic 5 is located inside the cavity at the center of the insulating spacer 2 and is clung to the first metal elastic sheet 3 and the second metal elastic sheet 4 respectively, the opening of the second metal casing 6 faces downwards and covers the upper side of the insulating spacer 2, and the lower portion of the insulating spacer 2 is sandwiched between the two metal casings to prevent the two metal casings from immediately contacting with each other; and the first metal elastic sheet 3 and the second metal elastic sheet 4 contact the two metal casings to form electrical connection.

Embodiment 4

As shown in FIG. 10, a manufacturing method of the chip-embedded RFID tag of Embodiment 1 of the present invention comprises the following steps:

a) forming a first metal elastic sheet 3 and two third metal elastic sheets 4 by stamping metal sheets, and welding the two third metal elastic sheets 41 to the RFID chip 42 to manufacture a second metal elastic sheet 4;

b) assembling the first metal elastic sheet 3, the second metal elastic sheet 4 and the insulating spacer 2, so that the first metal elastic sheet 3 and the second metal elastic sheet 4 are embedded to the side wall of the spacer body 21 of the insulating spacer 2 respectively, and the RFID chip 42 is located on the inner side of the insulating spacer 2;

c) pressing the insulating ceramic 5 to a center hole of the insulating spacer 2;

d) pressing the insulating spacer 2 assembled in the step c) into a cavity of a body 12 of a first metal casing 1 by means of a stamping machine, wherein the insulating spacer 2 is extruded to deform under stress during press-fitting to form close fit with barbs 7 on the inner wall of the first metal casing 1 to prevent the insulating spacer 2 from being separated from the first metal casing 1 after being assembled, and meanwhile, the first metal elastic sheet 3 and the second metal elastic sheet 4 are deformed under the extrusion of the inner wall of the first metal casing 1, so that the first metal casing 1 forms a desirable electrical connecting path with the first metal elastic sheet 3 and the second metal elastic sheet 4; and e) press-fitting the cylindrical second metal casing 6 which has one end opened, to the first metal casing 1 formed in the step d), wherein the outer diameter of the insulating spacer 2 is deformed under the extrusion of the barbs 7 on the inner wall of the second metal casing 6 during press-fitting, to form close fit with the inner wall to prevent the assembled second metal casing 6 from being separated from the insulating spacer 5, and in the meanwhile, the first metal elastic sheet 3 and the second metal elastic sheet 4 are deformed under the extrusion of the inner wall of the second metal casing 6, so that the second metal casing 6 forms a desirable electrical connecting path with the first metal elastic sheet 3 and the second metal elastic sheet 4.

In addition, for further illustrating the advantages of the present invention, Ansoft HFSS V12 is adopted as simulation software now to carry out a simulation experiment with regard to Embodiments 1, 2 and 3, and the obtained parameters include resonant frequency variation (curve S11 reflecting an impedance matching relation between the chip and the antenna) and the radiation pattern variation of the tag.

Put the RFID tag on a 100 mm*100 mm*1 mm metal plate to simulate an operation environment thereof on a metal surface.

Figure 11:
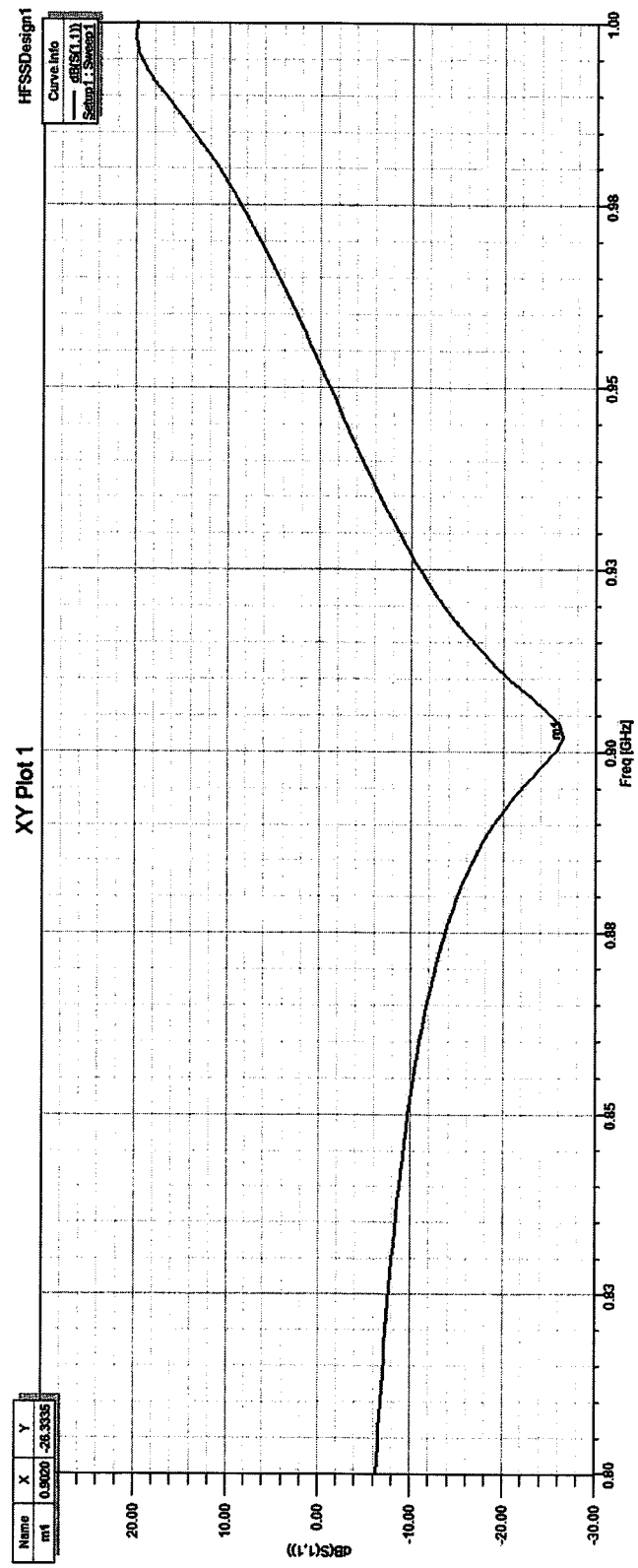
FIG. 11 is a graph of resonant frequency characteristic of the chip-embedded RFID tag and the antennae of Embodiment 1 of the present invention.
Figure 12:
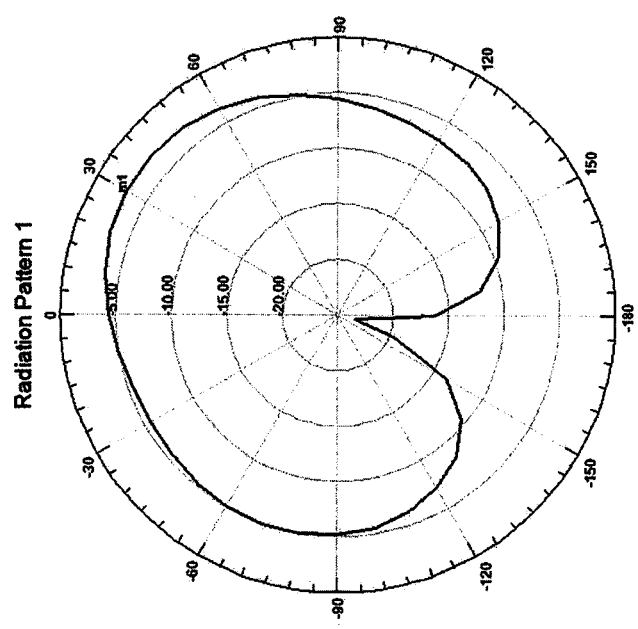
FIG. 12 is a radiation pattern of the chip-embedded RFID tag of Embodiment 1 of the present invention.
Figure 13:
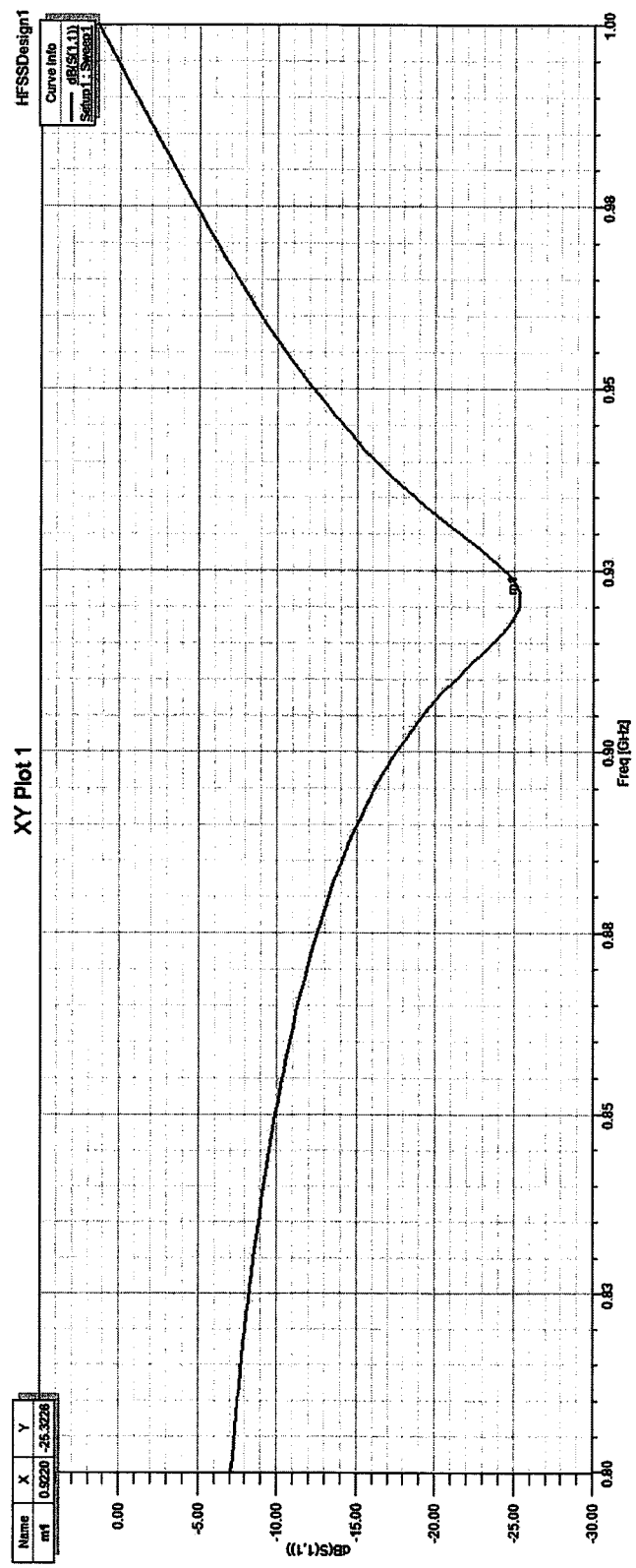
FIG. 13 is a graph of resonant frequency characteristic of the chip-embedded RFID tag and the antennae of Embodiment 2 of the present invention.
Figure 14:
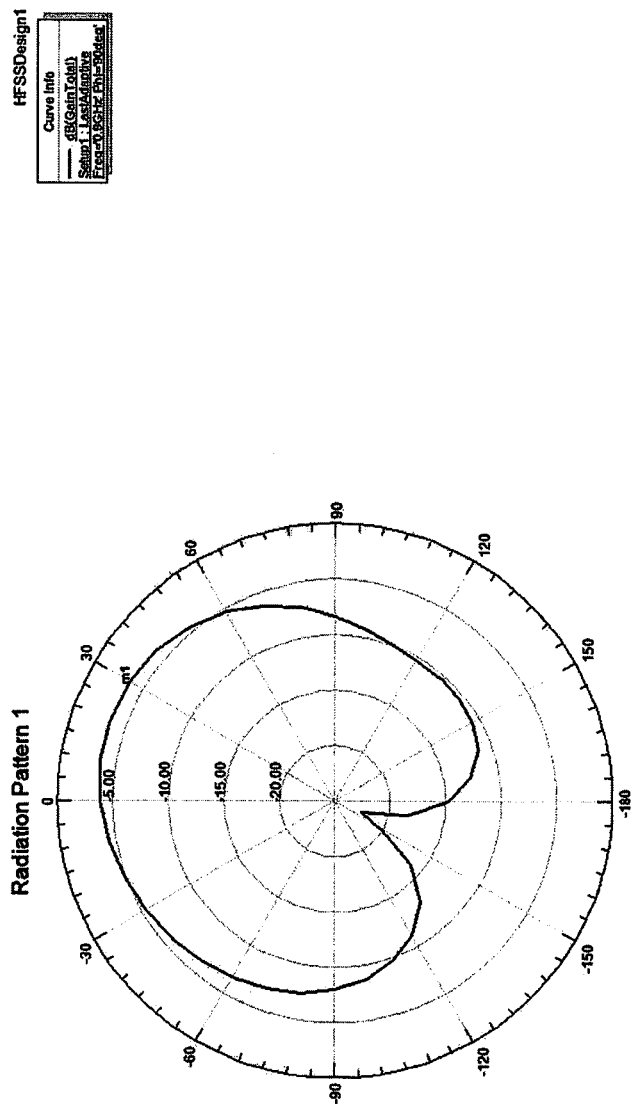
FIG. 14 is a radiation pattern of the chip-embedded RFID tag of Embodiment 2 of the present invention.

As shown in FIGS. 11 and 12, the resonant frequency of a tag of the corresponding structure of Embodiment 1 is 902 MHz, and S11 value is −26; and the maximum gain direction is observed at Theta=30° direction, the maximum value is −2.87 dB, and an average gain is about −5 dBi in a range of −90° to 90°. As shown in FIGS. 13 and 14, the resonant frequency of a tag of the corresponding structure of Embodiment 2 is 902 MHz, and S11 value is −25.3; and the maximum gain direction is not changed and stills in a 30° direction, but the average gain is about −7.5 dB in a range of −90° to 90°.

Figure 15:
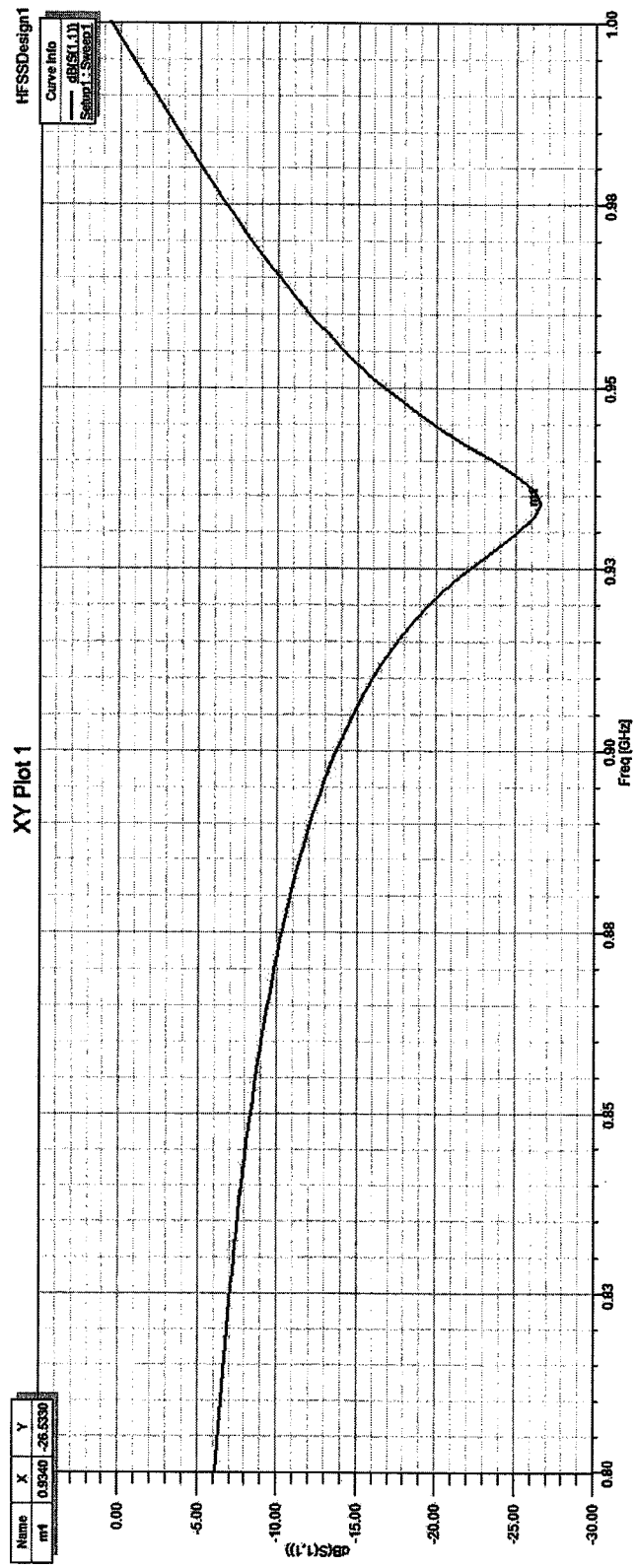
FIG. 15 is a graph of resonant frequency characteristic of the chip-embedded RFID tag and the antennae of Embodiment 3 of the present invention.
Figure 16:
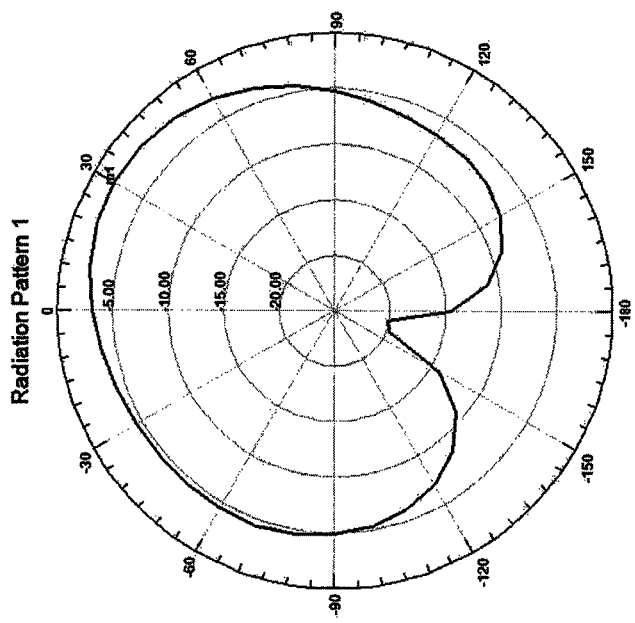
FIG. 16 is a radiation pattern of the chip-embedded RFID tag of Embodiment 3 of the present invention.

As shown in FIGS. 15 and 16, the resonant frequency of a tag of the corresponding structure of Embodiment 3 is 934 MHz, and S11 value is −26.5; and the maximum gain direction pattern is not changed and stills in a 30° direction, the maximum gain is about −2 dB, and the average gain is about −3 dB in a range of −90° to 90°.

The tags of the structures of the three embodiments are the same in that: the radiation pattern is not greatly changed in shape, and the maximum gain is maintained in a Theta 30° direction; and S11 value is not changed much, and this value reflects that the matching degrees of the antenna impedance and the chip impedance are nearly the same, i.e., the antenna impedance is not changed obviously.

The tags of the structures of the three embodiments are different in that:

(1) The resonant frequency of the tag changes; and the resonant frequency increases due to change of the structure. Since frequency is inversely proportional to wavelength, the present invention can achieve the minimum size under the same resonant frequency, and it means that the present invention is more beneficial to miniaturization of the product.

(2). The maximum gain of the antennae changes; and because the gain of the antennae of the tag will directly affect the reading distance of the tag, the higher the gain is, and the farther the identifying distance of the tag is. It can be seen by comparing the three simulations that the gain is higher and the reading distance is farther when two adjacent end surfaces of the first metal casing and the second metal casing are closer to the ground. In addition, both the coverage range of the direction pattern and the average gain at a certain angle are greatly improved, and therefore the identifiability of the tag in a range can be improved.

(3) The structure changes; and by comparing the three stimulations, wherein, Embodiment 1 of the present invention is firmest in structure design because the insulating spacer thereof is sandwiched between two metal casings, and the barb structure on the inner walls of the insulating spacer and the casings can form an effective anti-drop and anti-sliding structure. The structure of Embodiment 1 achieves an optimal proportion in performance and reliability.

Throughout the four embodiments, the present invention takes both of the electric performance and the mechanical performance into consideration and is the most optimized design.

The above-mentioned embodiments are just for an exemplary purpose, but do not limit the protection scope of the present invention, wherein in Embodiments 2 and 3, the securing means of the first metal casing, the second metal casing and the insulating spacer or the insulating ceramic is adhesion or other conventional securing means.

In the present invention, the first metal casing and the second metal casing are made of metal material, preferably aluminum alloy or stainless steel. Because the first metal casing and the second metal casing are made of metal, the strength of the tag can be improved, and the protection to the interior of the tag can be improved.

In the present invention, the cross section of the cavity defined by the first metal casing and the second metal casing may be also rectangular, or other any shapes that are capable of realizing the objective of the present invention, and the shapes of the insulating spacer and the insulating ceramic can be matched with the shapes of the two metal casings.

In the present invention, the first metal casing can be secured to an object by welding or adhering to the surface of the object, or is mounted to the object in a fastening manner via holes formed in the bottom of the first metal casing in a horizontal direction by means of steel ropes or bands, wherein the holes may be circular holes or rectangular holes.

In the present invention, the insulating ceramic may also be replaced by ABS (acrylonitrile-butadiene-styrene plastic), PC (poly carbonate), PET (polyethylene terephthalate), PTEE (polytetrafluoroethylene) or silica gel, and the insulating spacer may also be made of other insulating materials, such as ABS, PC, nylon or air.

The shapes of the metal elastic sheets are not specially limited in the present invention, and therefore all the shapes that are capable of making the first metal elastic sheet and the second metal elastic sheet to form electrical connection with the two metal casings are applicable to the present invention.

According to a part of the embodiments of the present invention, because electrical connection can be formed by using the elastic metal sheets, it can be ensured that desirable contact can be still kept under the conditions such as external impact, and the product reliability is improved.

In the present invention, the first metal elastic sheet and the second metal elastic sheet may also be components that are capable of making the first metal casing and the second metal casing to form electrical connection.

In Embodiment 1 of the present invention, the metal elastic sheets and the barb structure on the inner walls of the casings form buckles to effectively prevent the metal casings from falling off.

All the terms used in the present invention are interpreted in common meanings for those skilled in the art unless defined otherwise.

The embodiments as described in the present invention are merely illustrative, and do not limit the protection scope of the present invention. Various alternatives, variations and modifications can be made by those skilled in the art within the scope of the present invention, and therefore the present invention is not limited to the above-mentioned embodiments but merely limited by the claims.

The invention claimed is:

1. A chip-embedded RFID tag, comprising:
    a first metal casing;
    a spacer insulator disposed on the first metal casing;
    a second metal casing disposed on the spacer insulator;
    a first electrical connecting component for connecting the first metal casing and the second metal casing to form electrical connection;
    second electrical connecting components for connecting an RFID chip with the first metal casing and the second metal casing respectively, to form electrical connections; and
    wherein the first metal casing is separated from the second metal casing by the spacer insulator.

2. The chip-embedded RFID tag according to claim 1, wherein the first electrical connecting component and the second electrical connecting components are metal sheets.

3. The chip-embedded RFID tag according to claim 1, wherein the first electrical connecting component and the first metal casing are of an integrated structure, or the first electrical connecting component and the second metal casing are of an integrated structure.

4. The chip-embedded RFID tag according to claim 1, wherein the first metal casing and the second metal casing are made of aluminum alloy or stainless steel.

5. The chip-embedded RFID tag according to claim 1, wherein the first metal casing is welded or adhered to an object.

6. The chip-embedded RFID tag according to claim 1, wherein through holes are formed in the bottom of the first metal casing and used for mounting the first metal casing to an object in a fastening manner by means of steel ropes, bands or screws.

7. The chip-embedded RFID tag according to claim 1, wherein the spacer insulator comprises an insulating spacer and filler, wherein the first electrical connecting component, the second electrical connecting components and the RFID chip are sandwiched between the insulating spacer and the filler.

8. The chip-embedded RFID tag according to claim 7, wherein a material of the insulating spacer is selected from acrylonitrile-butadiene-styrene plastic, poly carbonate or nylon.

9. The chip-embedded RFID tag according to claim 7, wherein a material of the filler is selected from ceramic, acrylonitrile-butadiene-styrene plastic, poly carbonate plastic, polyethylene terephthalate plastic, polytetrafluoroethylene, silica gel or air.

10. The chip-embedded RFID tag according to claim 7, wherein each of the first metal casing and the second metal casing is a cylinder with one end closed and the other end opened, the insulating spacer consists of an annular spacer body and an annular bulge surrounding the circumference of the spacer body, the annular bulge is sandwiched between the adjacent end surfaces of the two metal casings, and the filler is located inside a cavity at the center of the insulating spacer.

11. The chip-embedded RFID tag according to claim 10, wherein the second electrical connecting components are clamped to the inner wall of an body of the insulating spacer, each second electrical connecting component is formed by stamping a metal sheet and has a vertical portion, a horizontal portion connected with the vertical portion and an inclined portion connected with the horizontal portion, and the vertical portions of the two second electrical connecting components are respectively secured to two pins of the RFID chip in a welding manner.

12. The chip-embedded RFID tag according to claim 11, wherein barbs are formed on the inner wall of the first metal casing and the inner wall of the second metal casing.

13. A manufacturing method of a chip-embedded RFID tag, comprising the following steps:
    a) securing an RFID chip to two second electrical connecting components;
    b) press-mounting a first electrical connecting component, a spacer insulator and the RFID chip assembled in the step a) to a surface of a first metal casing, and making the first electrical connecting component and second electrical connecting components to contact the first metal casing; and
    c) press-fitting a second metal casing with the first metal casing assembled in the step b), and making the first electrical connecting component and the second electrical connecting components to contact the second metal casing respectively.

14. The method according to claim 13, wherein the spacer insulator comprises an insulating spacer and filler, wherein the step a) comprises: stamping a metal sheet to form two second electrical connecting components, and welding two pins of the RFID chip with the two second electrical connecting components; and stamping a metal sheet to form a first electrical connecting component;
    the step b) comprises: assembling the first electrical connecting component, the assembled second electrical connecting components and the RFID chip with the insulating spacer and the filler, so that the first electrical connecting component, the second electrical connecting components and the RFID chip are sandwiched between the insulating spacer and the filler; and
    the step c) comprises: press-mounting the filler and the insulating spacer assembled in the step b) to the first metal casing, and making the first electrical connecting component and the second electrical connecting components between the filler and the insulating spacer to contact the first metal casing respectively; and press-fitting the second metal casing with the assembled first metal casing, and making the first electrical connecting component and the second electrical connecting components to contact the second metal casing respectively.

* * * * *